US008560859B2

(12) United States Patent
Boucher et al.

(10) Patent No.: US 8,560,859 B2
(45) Date of Patent: *Oct. 15, 2013

(54) DOUBLE AUTHENTICATION FOR CONTROLLING DISRUPTIVE OPERATIONS ON STORAGE RESOURCES

(71) Applicant: International Business Machines Corporation, Armonk, NY (US)

(72) Inventors: Vincent Boucher, Thoiry (FR); Sebastien Chabrolles, Baillargues (FR); Benoit Granier, Vailhauques (FR); Arnaud Mante, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/837,127

(22) Filed: Mar. 15, 2013

(65) Prior Publication Data

US 2013/0212400 A1    Aug. 15, 2013

Related U.S. Application Data

(63) Continuation of application No. 12/238,821, filed on Sep. 26, 2008.

(30) Foreign Application Priority Data

Oct. 3, 2007    (EP) ..................................... 07117839

(51) Int. Cl.
*G06F 21/00*    (2013.01)
(52) U.S. Cl.
USPC ........... 713/182; 713/183; 713/184; 713/185; 713/186; 713/168; 713/169; 713/170; 713/171; 713/172; 713/173; 713/174; 726/2; 726/3; 726/4; 726/5; 726/6; 726/7; 726/8; 726/9; 726/27; 726/28; 726/29; 726/30; 709/225; 709/229

(58) Field of Classification Search
USPC .................. 713/168–174, 182–186; 726/2–8, 726/27–30; 709/225, 229
See application file for complete search history.

(56) References Cited

U.S. PATENT DOCUMENTS 6,690,786 B1    2/2004    Kowal et al.
7,234,116 B2    6/2007    Watanabe et al.
(Continued)

OTHER PUBLICATIONS

Sam Coleman et. al, "Mass storage System Reference Model", May 1990.*

(Continued)

*Primary Examiner* — Taghi Arani
*Assistant Examiner* — Josnel Jeudy
(74) *Attorney, Agent, or Firm* — Roy W. Truelson

(57) ABSTRACT

A storage controller and program product is provided for performing double authentication for controlling disruptive operations on storage resources generated by a system administrator. A first request is received from a first user for generation of a first key. A first key is generated, provided to the first user and associated with the storage resource. An input is received from the administrator, the input comprises a second key and a command for performing the disruptive operation. The second key and the first key are compared. It is verified that the administrator is authorized as an administrator of the storage resource. The disruptive operation is performed on the storage resource if the second key and the first key match and the administrator is authorized. Otherwise, the performance of the disruptive operation is denied.

10 Claims, 9 Drawing Sheets

(56) References Cited

U.S. PATENT DOCUMENTS

2002/0198830 A1 12/2002 Randell et al.
2006/0041756 A1 2/2006 Ashok et al.
2007/0220268 A1* 9/2007 Krishnaprasad et al. ..... 713/182
2008/0046998 A1 2/2008 Cromer et al.

OTHER PUBLICATIONS

Sam Coleman et al., "Mass Storage System Reference Model", May 1990, IEEE Technical Committee.

* cited by examiner

DOUBLE AUTHENTICATION FOR CONTROLLING DISRUPTIVE OPERATIONS ON STORAGE RESOURCES

CROSS-REFERENCE TO RELATED APPLICATIONS

This is a continuation of pending U.S. patent application Ser. No. 12/238,821, filed Sep. 26, 2008, entitled "Double Authentication for Controlling Disruptive Operations on Storage Resources", which is herein incorporated by reference. This application claims priority under 35 U.S.C. §120 of U.S. patent application Ser. No. 12/238,821.

This application is also related to commonly assigned U.S. patent application Ser. No. 13/837,454, filed Mar. 15, 2013, entitled "Double Authentication for Controlling Disruptive Operations on Storage Resources", which is herein incorporated by reference.

FIELD OF INVENTION

The invention relates to a method and data processing system for providing double authentication for controlling disruptive operations on storage resources.

BACKGROUND

Storage systems may be used by multiple users, or departments of an organization or company. Storage resources may be allocated to teams, with a single administrator, or a small number of administrators responsible for the allocation and maintenance of the storage resources.

In a large organization, an administrator may be responsible for the maintenance of a large number of storage resources which may be allocated to a large number of different users. The administrator may be authorized to execute disruptive commands such as the erasure of data, the deletion of erase, the deletion of volumes, the allocation and the removal of allocation of storage resources. Such a system prevents the loss of data by errors on behalf of the user, but data loss can still occur as a result of an error on the part of the administrator.

SUMMARY OF THE INVENTION

The present invention is directed to a method, data processing system, and computer program as defined in the independent claims. Further embodiments of the invention are described in the dependent claims.

According to an embodiment of the present invention, there is provided a method of performing a disruptive operation on a storage resource by an administrator. The method comprises receiving a first request from a first user for generation of a first key, generating a first key, providing a first key to a first user, and associating the first key with the storage resource. The method further comprises receiving an input from the administrator. The input from the administrator comprises a second key and a command for performing the disruptive operation. The method further comprises comparing the second key and the first key, and verifying that the administrator is authorized as an administrator of the storage resource. The method further comprises performing the disruptive operation on the storage resource if the first key and the second key match and the administrator is authorized. Otherwise, the performance of the disruptive operation is denied.

The method has the advantage that authorization from the user is required in addition to the administrator being authorized as an administrator in order to perform the disruptive command. Since the first key and the second key must match in order to perform the disruptive operation, the disruptive operation cannot be performed without the user's authorization which is given by the user supplying the first key to the administrator.

In accordance with an embodiment of the present invention, the first key is stored in an object on a storage controller which is coupled to the storage resource.

In accordance with an embodiment of the present invention, the request for generation of the first key comprises an identifier of the first user. The first key is only provided if the first user is associated with the storage resource. This has the advantage that only users associated with the storage resource can create keys and therefore authorize disruptive operations on the storage resource.

In accordance with an embodiment of the present invention, the step of verifying the administrator is authorized as an administrator comprises checking an administrator key matches an administrator key associated with the storage resource.

In accordance with an embodiment of the present invention, the method further comprises receiving a second request from a second user and generating and providing a third key to a second user and associating the third key with the storage resource. The operation on the storage resource is performed if the second key matches the first key associated with the storage resource, or the third key associated with the storage resource. This allows more than one user to authorize disruptive operations on the storage resource.

In accordance with an embodiment of the present invention, the method further comprises receiving a second request from a second user, generating and providing a third key to the second user, and associating the third key with the storage resource. The input further comprises a fourth key and the operation on the storage resource is only performed if the second key and the fourth key match the first key and the third keys associated with the storage resource. This allows the performance of a disruptive operation to require authorization from two users.

In accordance with an embodiment of the present invention, an expiry time is associated with the key, and the disruptive operation is only performed on the storage resource if the expiry time has not elapsed. This reduces the likelihood that an administrator can accidentally perform a disruptive operation on the wrong storage resource because the keys only have a limited lifespan.

In accordance with an embodiment of the present invention, the keys may be revoked by a fourth user. If a key has been revoked, the disruptive operation cannot be performed using the key.

In accordance with an embodiment of the present invention, there is provided a computer program product. The computer program product comprises software code portions. The software code portions are adapted to perform a method in accordance with an embodiment of the present invention when said program is run on a computer.

In accordance with an embodiment of the present invention, there is provided a data processing system for performing a disruptive operation on a storage resource.

In accordance with an embodiment of the present invention, there is provided a storage controller coupleable to a plurality of storage resources. The storage controller comprises a processor, storage for data comprising data associating a first storage resource with a first project and associating a first key with a first project. The storage controller further comprises a program module comprising instructions for performing a method. The method comprises receiving an input from an administrator. The input comprises a second key, an identifier of a storage resource, and a command for performing a disruptive operation.

The method further comprises determining a first key associated with the first storage resource by reading the key associated with the project to which the first storage resource is associated. The method further comprises comparing the second key and the first key. The method further comprises verifying that the administrator is authorized as an administrator of the storage resource. The method further comprises performing the disruptive operation on the storage resource if the second key and the first key match, and the administrator is authorized. Otherwise, performance of the disruptive operation is denied.

BRIEF DESCRIPTION OF THE DRAWINGS

In the following embodiments of the invention will be described in greater detail by way of example only making reference to the drawings in which.

DETAILED DESCRIPTION

Figure 1:
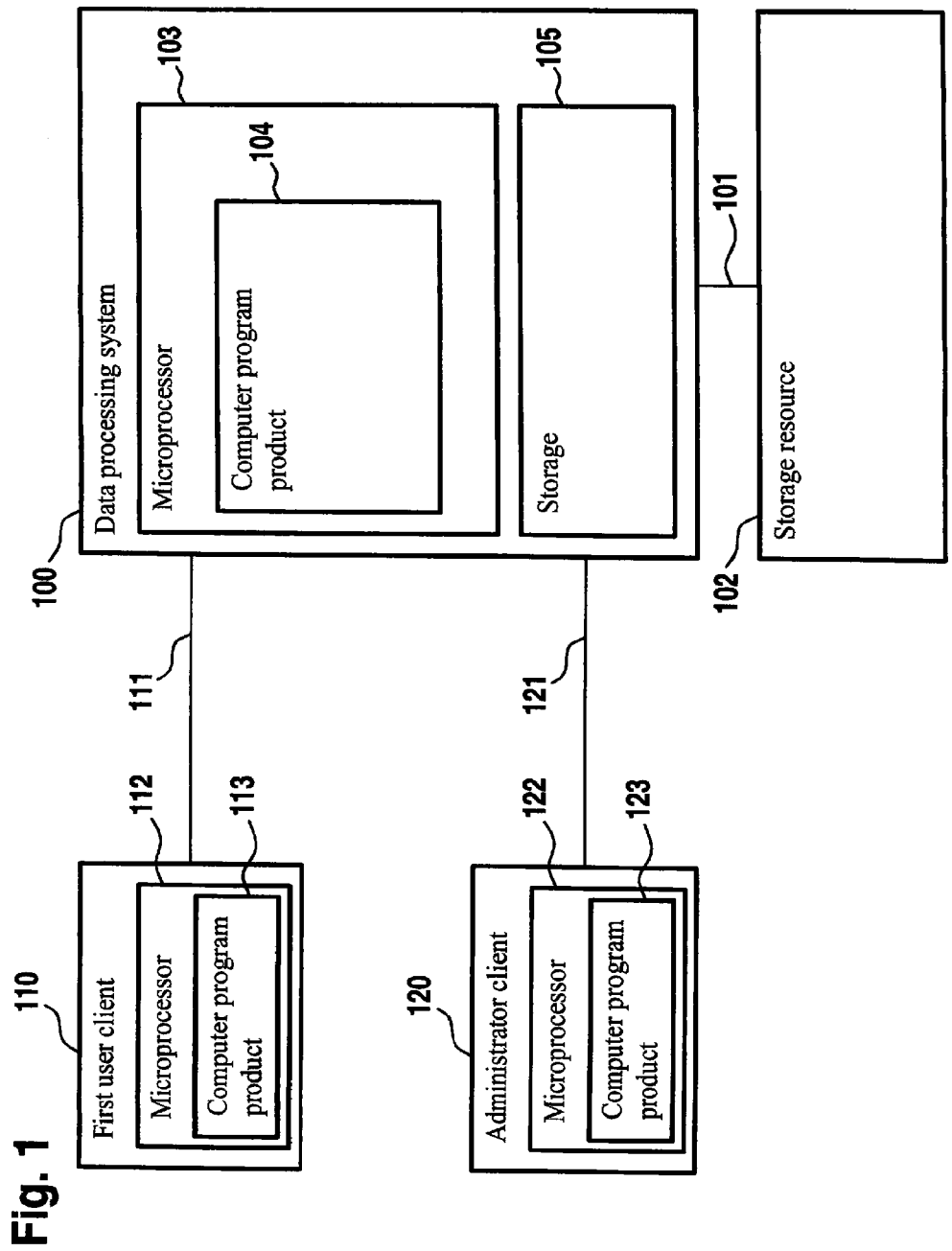
FIG. 1 shows a block diagram of a data processing system.

FIG. 1 shows a block diagram of a data processing system 100. The data processing system 100 is coupled to storage resource 102 by connection 101. Data processing system 100 comprises microprocessor 103 which is used to execute a computer program product 104. Data processing system 100 comprises storage 105 which stores code of computer program product 104. The code for computer program product 104 can be loaded onto the microprocessor 103 for execution.

Data processing system 100 is coupled to first user client 110 by network connection 111. First user client 110 comprises microprocessor 112, which is used to execute computer program product 123. Data processing system 100 is connected to administrator client 120 by network connection 121. Administrator client 120 comprises microprocessor 122. Microprocessor 122 executes computer program product 123.

A first user may use first user client 110. Computer program product 123 may include an operating system allowing the first user to logon and communicate via network 111 with data processing system 100. The first user may request generation of a first key by the data processing system 100. The computer program product 104 is operable to generate a first key and to associate the first key with a storage resource 102. The first key is also provided to the first client via network 111. Computer program product 123 may be operable to receive the first key over network 111 and supply the first key to the first user. Computer program product 123 may also be operable to store the first key. Once the first user has received the first key the first user may supply the first key to an administrator. The administrator may be a user logged on to administrator client 120. Computer program product 123 may contain instructions which give the administrator logged onto administrator client 120 administrative rights over data processing system 100 and storage resource 102.

The administrator logged onto administrator client 120 may input a command for performing a disruptive operation on storage resource 102. The command may be inputted via a graphical user interface or a command line interface. Computer program product 123 comprises the interface for the administrator to input the command. In addition to a command the administrator also inputs a second key. The second key is the key supplied to the administrator by the first user. The terms first and second key are used here to differentiate between the key generated by computer program product 104 and associated with storage resource 102 by computer program product 104 which is supplied to the first user. The term second key is used for the key inputted by the administrator on the administrator client 120. The input is received by data processing system 100 over network 121. The computer program product 104 contains instructions which when executed compare second key and the first key.

The computer program product 104 further contains instructions which verify that the user logged onto administrator client 120 is an administrator. This may for example include verifying an administrator key matches an administrator key associated with the storage resource 102. If it is verified that the first key and the second key match and the administrator is authorized as an administrator of storage resource 102, the disruptive operation contained within the command is performed upon storage resource 102. Otherwise the disruptive operation is not performed.

Disruptive operations include the erasure of data, the deletion of volumes, the deletion of arrays, and the removal of resource allocation. Disruptive operations also include the suppression or deletion of mappings of logical unit numbers to hosts, the suppression of logical volumes and the formatting or unformatting of RAID arrays.

Figure 2:
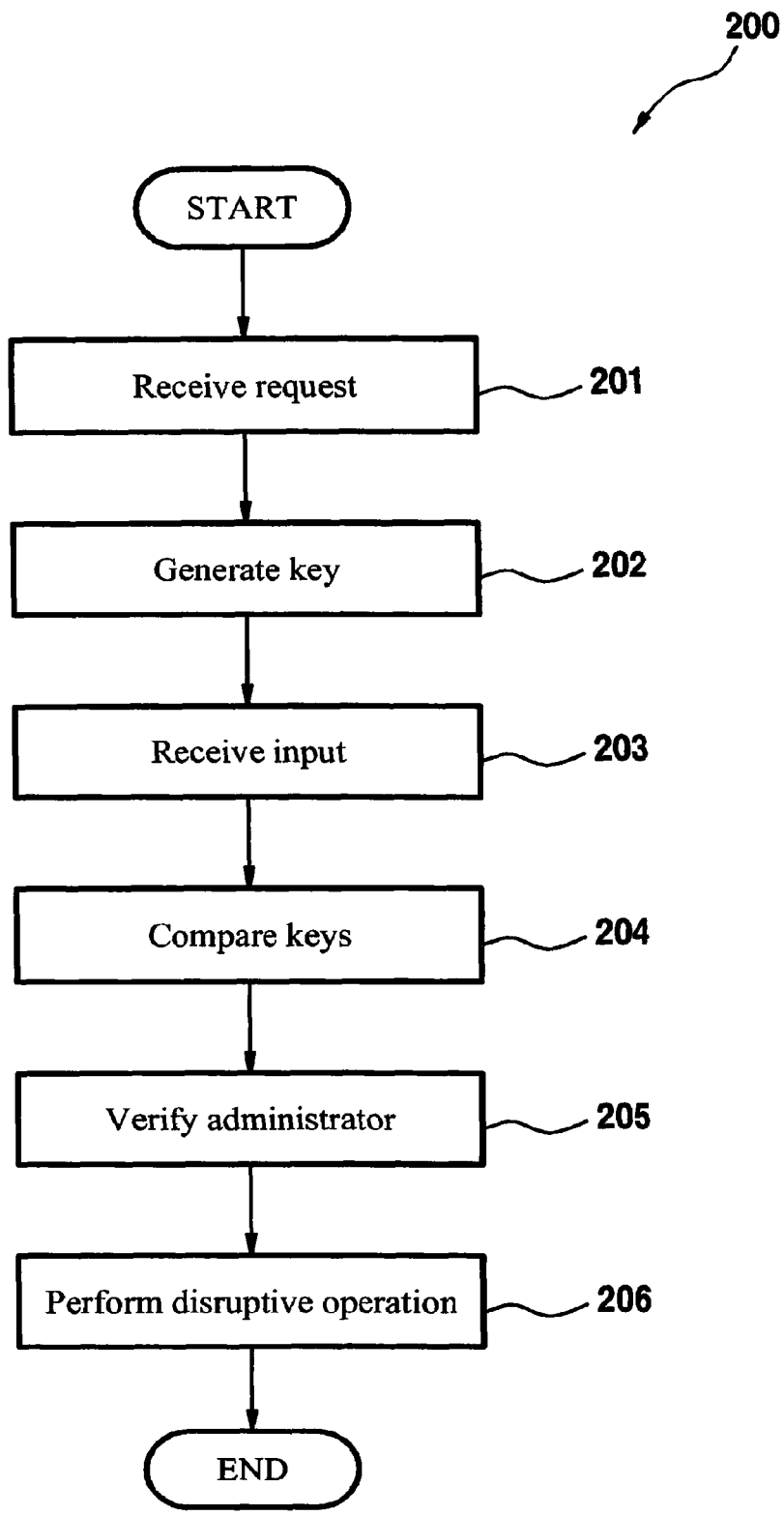
FIG. 2 shows a flow diagram illustrating steps performed in a method of performing a disruptive operation.

FIG. 2 shows a method 200 for performing a disruptive operation on a storage resource by an administrator. The method shown in FIG. 2 may be executed on a data processing system such as that shown in FIG. 1. In step 201a request is received from a first user for generation of a first key. In step 202 a first key is generated, the first key is associated with a storage resource, and the first key is supplied to a first user. In step 203, an input is received from an administrator. The input comprises a second key and a command for performing a disruptive operation. In step 204, the second key and the first key are compared. In step 205, it is verified that the administrator from whom the input is received is authorized as an administrator of a storage resource. In step 206 the disruptive operation is performed if the second key and the first key match and the administrator is authorized. Otherwise the performance of the disruptive operation is denied.

Figure 3:
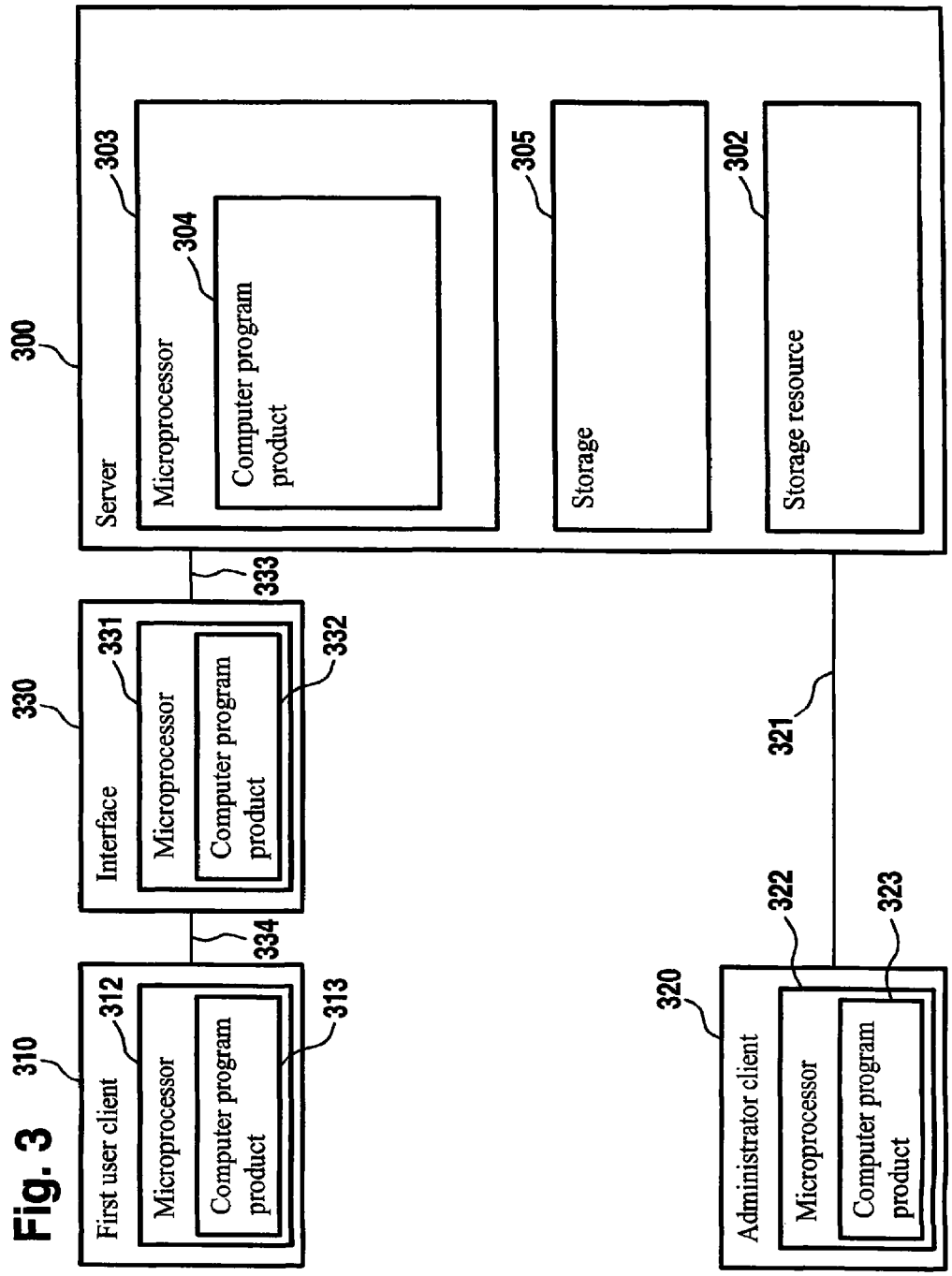
FIG. 3 shows a block diagram of a data processing system.

FIG. 3 shows a data processing system according to an embodiment of the present invention for performing a disruptive operation on a storage resource 302. First user client 310 comprises microprocessor 312 on which computer program product 313 is executed. The first user client 310 is connected to interface 330 by network 334. Interface 330 comprises microprocessor 331. Computer program product 332 is executed on microprocessor 331. Computer program product 332 comprises instructions to generate a first key in response to a request from a first user logged onto first user client 310 through computer program product 313. Interface 330 may for example be a web service. In response to the request interface 330 generates a first key and associates the first key with storage resource 302. This association may be stored in storage 305. The first key is generated by interface 330 and sent to server 300 over network 333 for association with storage resource 302. The first key is also supplied to a first user on first user client 310 over network 334.

Administrator client 320 functions in an analogous manner to administrator client 120 shown in FIG. 1. The administrator receives a key from the first user, this key is input into an operating system with a command to perform a disruptive operation on storage resource 302. The operating system may be executed as computer program product 323 on microprocessor 322. The command and key are sent to server 300 over network 321. The computer program product 304 executed on processor 303 contains instructions to compare the second key received on administrator client 320 with a first key stored in storage 305. The computer program product 304 additionally contains instructions to check whether the user logged onto administrator client 320 is authorized as an administrator of storage resource 302. If the second key and the first key match, and the administrator is authorized, then the disruptive operation specified in the command is performed upon storage 302.

Figure 4:
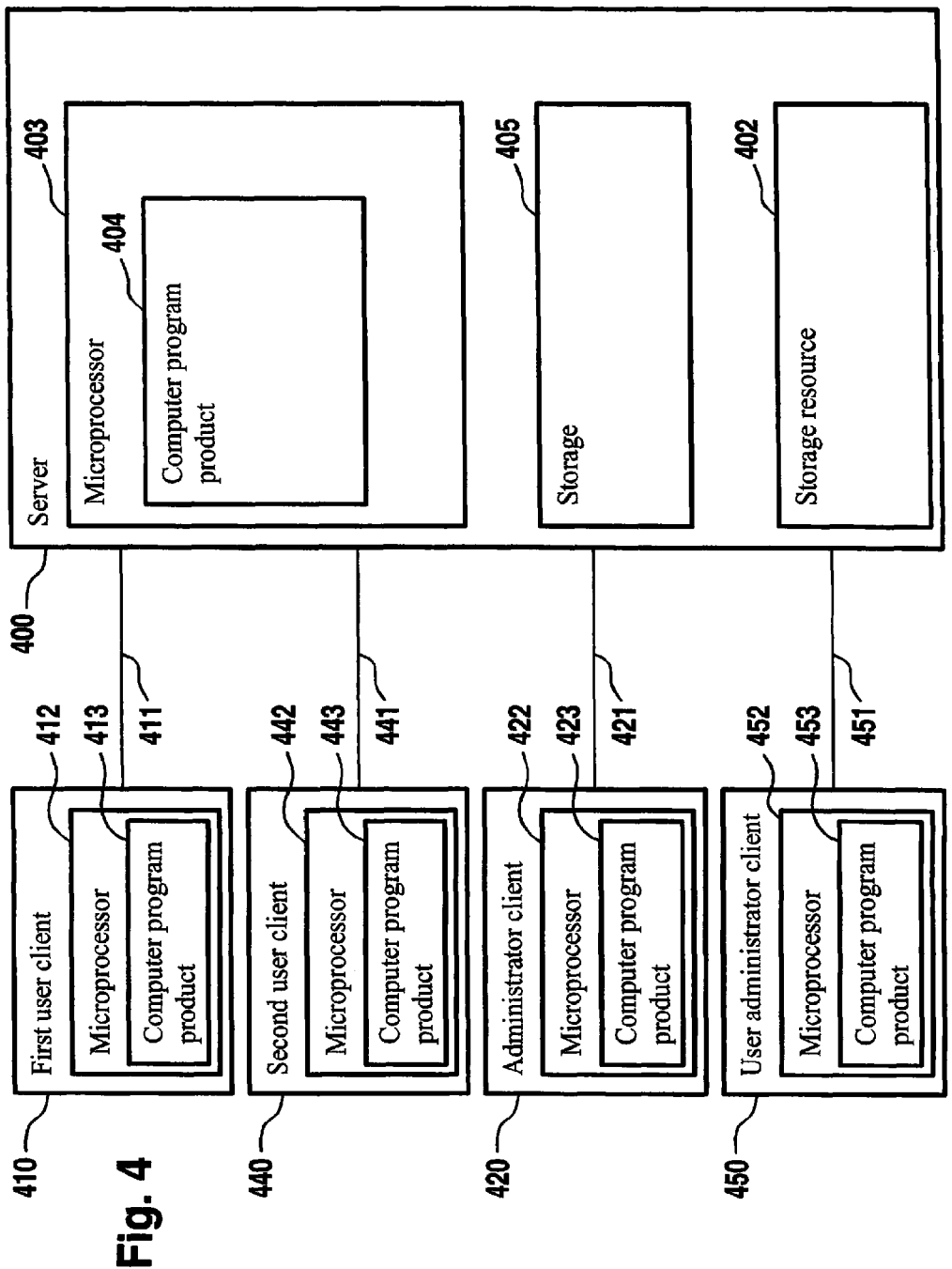
FIG. 4 shows a block diagram of a data processing system.

FIG. 4 shows a data processing system according to an embodiment of the present invention. The data processing system comprises server 400, first user client 410, second user client 440, administrator client 420, and user administrator client 450. Server 400 comprises microprocessor 403. Computer program product 404 is executed on microprocessor 403. Server 400 further comprises storage 405. Storage 405 contains data associating users with storage resource 402. The data associating users with storage resource 402 stored in storage 405 may be amended by user administrator. The user administrator is logged onto user administrator client 450. User administrator client 450 comprises microprocessor 452 which executes computer program product 453. User administrator client communicates with server 400 over network 451.

First user client 410 comprises microprocessor 412 on which computer program product 413 is executed. Computer program product 413 contains programs on which a first user may logon onto first user client 410. First user client 410 is connected to server 400 over network 411. The first user may request generation of a first key using computer program product 413. Following this request, server 400 may check using computer program product 404 that storage 405 includes an association between the first user and storage resource 402. If such an association exists, the first key may be generated on the server and supplied to the first user on first user client 410 over network 411. Second user client 440 function in the same manner as first user client 410. A second user logged onto second user client 440 using computer program product 443 executed on microprocessor 442 may request generation of a third key over network 441. Such a request may be granted if storage 405 contains data associating the second user with a storage resource 402.

In the data processing system shown in FIG. 4, a disruptive command on storage resource 402 may require authorization from one of the users either the second user or the first user, or may require authorization from both of the users, the second user and the first user. The administrator logged onto administrator client 420 may enter a command into an interface which is comprised within computer program product 423 which is executed on microprocessor 422. The input comprises a command for a disruptive operation on storage resource 402, and a key, or a command for a disruptive operation and two keys.

Figure 5:
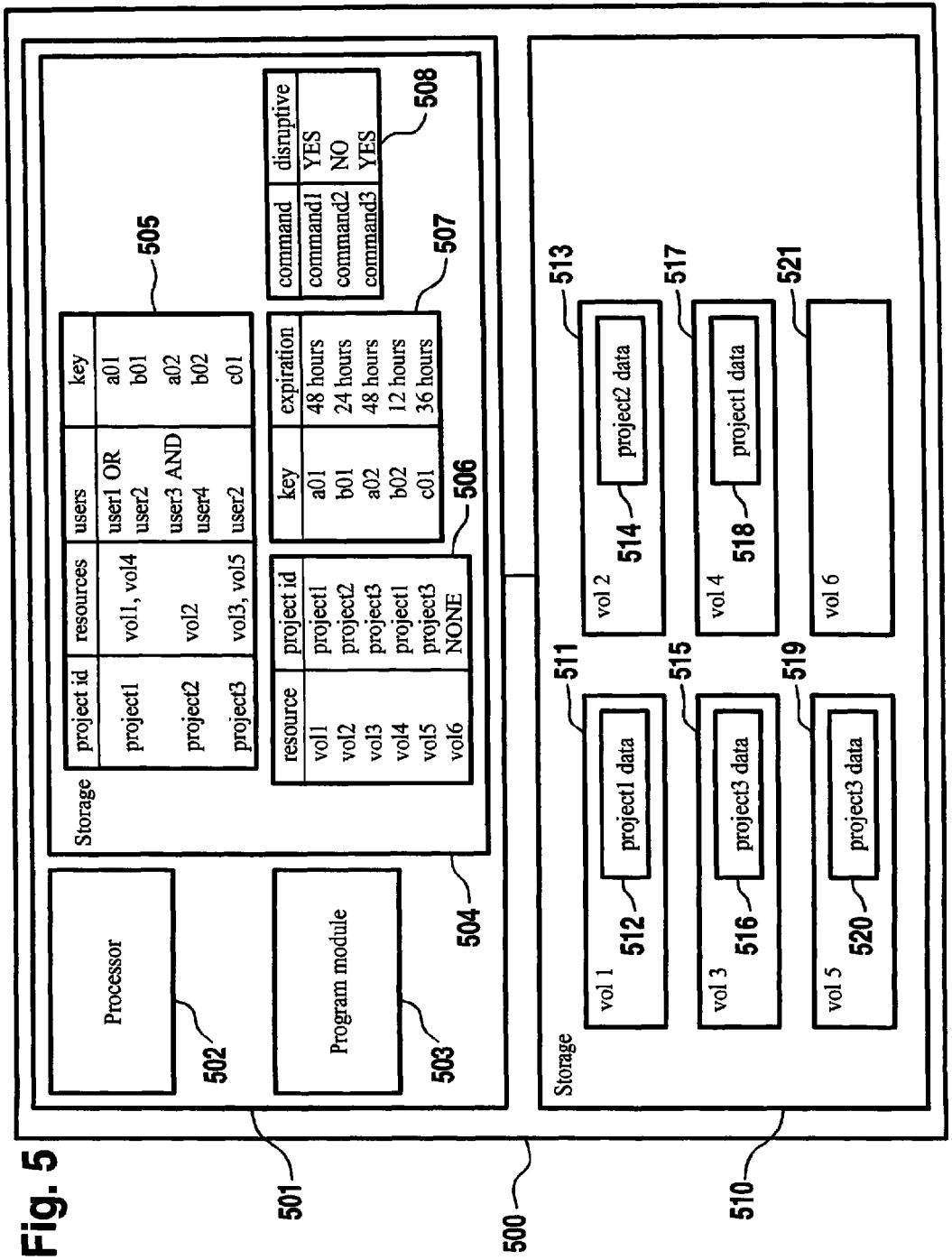
FIG. 5 shows a block diagram of a storage controller.

FIG. 5 shows a data processing system 500 for performing a disruptive operation on a storage resource. The data processing system 500 comprises storage controller 501 and storage 510. Storage controller 501 and storage 510 may be parts of a storage area network (SAN). Storage controller 501 comprises processor 502 onto which programs from program module 503 can be loaded and executed. Storage controller 501 further comprises storage 504 for data objects 505, 506, 507 and 508. Storage 510 comprises storage resources 511, 513, 515, 517, 519, and 521. The storage resources may for example be volumes. Storage 510 is coupled to storage controller 501. The storage resources contained within storage 510 may contain project data, storage resource 511 contains project 1 data 512, storage resource 513 contains project 2 data 514. Storage resource 515 contains data 516 which comprises project 3 data, storage resource 517 comprises data 518 which contains project 1 data. Storage resource 519 contains data 520 which comprises project 3 data. Storage resource 521 does not contain any project data.

Storage 504 of storage controller 501 contains objects which associate the data stored in storage 510 with projects object 506 shows the associations between volumes and projects. Object 505 shows the associations between projects, resources, users, and keys. Project 507 associates keys with expiration times. Storage object 508 associates commands with an indication whether the command is disruptive or not.

Figure 6:
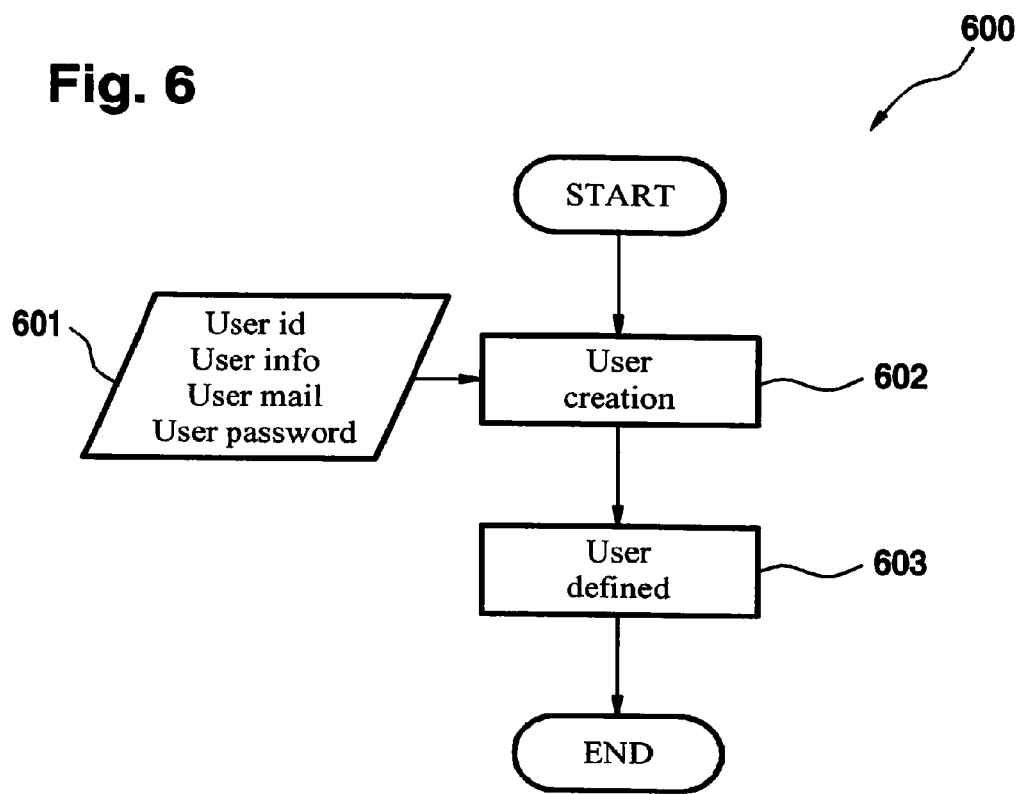
FIG. 6 shows a flow diagram illustrating steps performed in a method of creating a user.

FIG. 6 shows a method 600 for creation of users. The method 600 may be used to create users for associating with projects with the user identifiers stored in an object such as object 505. The input for user creation is shown in 601. In step 602 a user is created using the user ID, user info, user password, and user mail specified in 601. In step 603, the user is defined.

Figure 7:
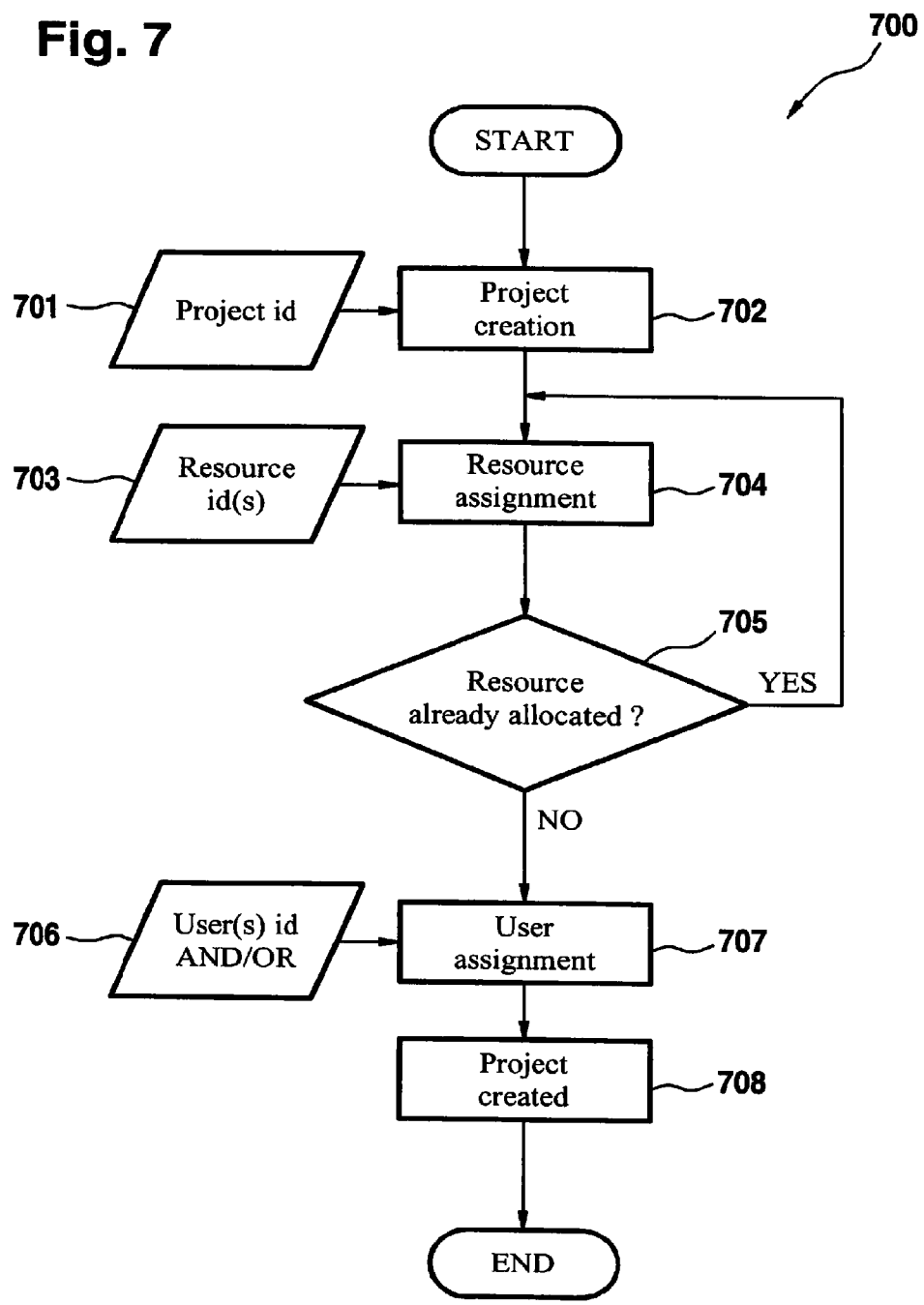
FIG. 7 shows a flow diagram illustrating steps performed in a method of creating a project.

FIG. 7 shows a method 700 for creating projects and associating the projects with storage resources. In step 702 a project is created under a project ID specified in 701. Resource IDs 703 are input into step 704 for resource assignment. The resource ID's input may for example by the volume identifiers such as those shown in FIG. 5 associated with storage resources 511, 513, 515, 517, 519 and 521. In step 705 it is determined whether the specified resource has already been allocated. This check may take place by checking object 506 which specifies if volumes have been assigned to projects. In step 707 users are assigned to the project.

The users assigned to the project may be assigned as 'and' or 'or'. If the users are assigned as 'or', then either of the users can authorize disruptive operations by requesting that keys be created. If the users are designated 'and', then in order to perform a disruptive operation, a key from both of the users or all of the users assigned to the project is required in order to authorize a disruptive operation. In step 708, the project is created. The method 700 involves filling the first three columns of the object shown as 505 in FIG. 5.

Figure 8:
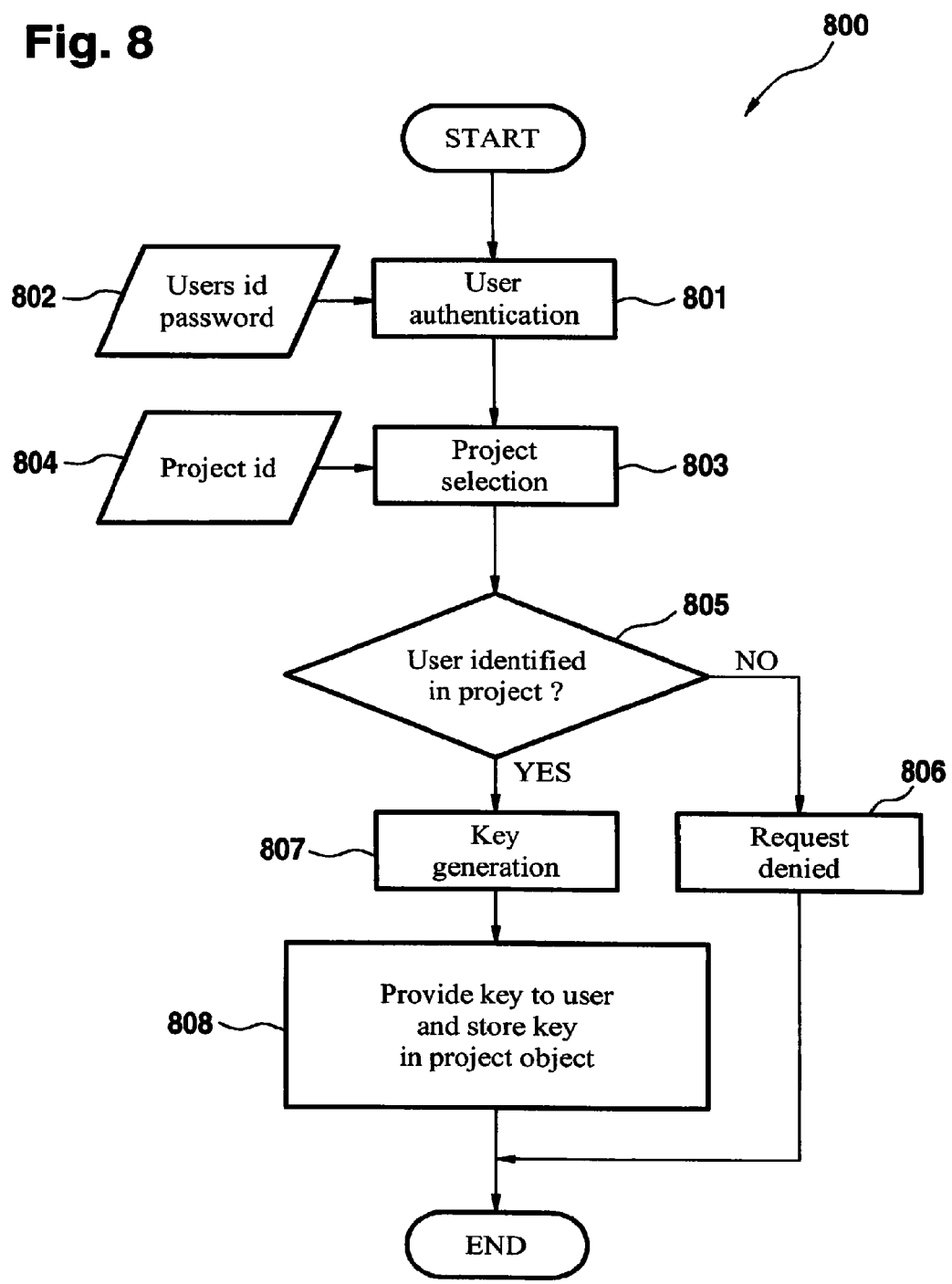
FIG. 8 shows a flow diagram illustrating steps performed in a method of generating a key.

FIG. 8 shows a method for generating a key in response to a request from a user. In step 801, the user is authenticated. The user is authenticated using an ID and password 802. In step 803, a project is selected. This occurs by the user supplying a project ID. The user ID password, and project ID may be input into a user client such as those shown in FIGS. 1, 3, and 4. Method 800 may take place either on a storage controller coupled to a storage resource such as that shown in FIG. 5, or on an interface such as that shown as 330 in FIG. 3. In step 505 a determination is made as to whether the user is identified in the project specified by the project ID 804. This may take place for example by reading the object 505 shown in FIG. 5. If the user is not identified in the project then the request for generation of a key is denied in step 806. If however, the user is identified in the project, then the key is generated in step 807. The key is provided to the user and stored in a project object 505 in step 808. Step 808 may also involve assigning an expiration time to the key and storing the key and the expiration time in object 507.

Figure 9:
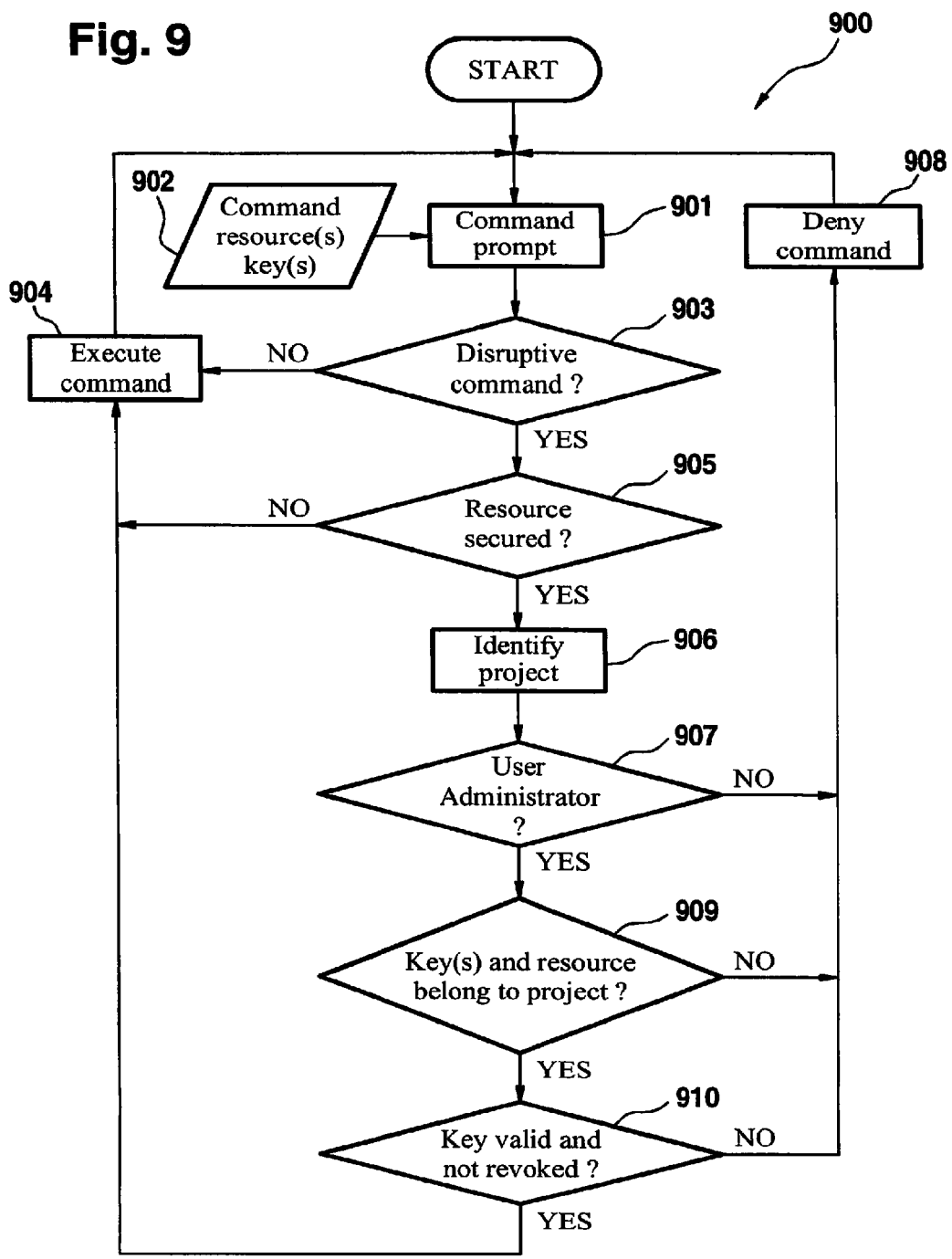
FIG. 9 shows a flow diagram illustrating steps performed in a method of performing a disruptive operation.

FIG. 9 shows a method 900 for performing a disruptive command by an administrator. In 901, a command prompt is displayed to an administrator. The command prompt may be on an administrator client as part of a computer program product such as that shown in FIGS. 1, 3, and 4. The administrator inputs a command, resources and keys, the resources specifying which storage resources have the disruptive operation specified by the command performed on them. The keys in 902 are received by the administrator from a user or a number of users.

In step 903, a determination as to whether the command is a disruptive command is made. This may be made for example by reading the data object 508 which specifies whether commands are disruptive. If the command is not a disruptive command, then the command is executed in step 904. If the command is disruptive, then the method moves to step 905 where a determination as to whether the resource has been secured is made. Resources can be secured by assigning a project identifier to the resource. Thus, the determination in step 905 can be made by reading object 506 and, if no project is assigned to the resource, then the resource is determined as not being secured. For example, resource volume 6 has a project ID non-assigned to it therefore that resource is not secured so a disruptive command can be performed on resource 521. If the determination is made that the resource is not secured in step 905, then the command is executed in 904. If, however, the resource is determined as being secured in step 905, then the method moves to step 906 where the project is identified. The project may be identified in step 906 by reading object 506.

In step 907, a determination is made as to whether the user is an administrator. This may take place for example by determining whether an administrator key supplied by the administrator matches an administrator key stored on the storage controller 501. This may occur automatically. If the user is determined as to not be an administrator, then the command is denied in step 908. However, if the administrator is confirmed as being an administrator, then the method moves to step 909. In step 909, a determination is made as to whether the keys and the resource belong to the project identified in step 906. This may take place by reading object 505.

If the keys and resource do not belong to the project, then the command is denied in step 908. If the keys and resource do belong to the project, then the method moves to step 910. In step 910, it is checked whether the key is valid and not revoked. This may be made by reading object 507. Further, keys may be revoked by a user administrator which is that discussed with reference to user administrator client 450 in FIG. 4. The user administrator may be able to revoke keys by for example deleting entries from object 507, or object 507 may include an extra column specifying whether or not the key has been revoked.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The invention claimed is:

1. A storage controller coupled to plurality of storage resources, the storage controller comprising:
    a processor operable to perform a disruptive operation on each of the storage resources of the plurality of storage resources;
    a storage for storing data comprising data associating an at least a first storage resource of the plurality of storage resources with a first project and associating a first key and a third key with the first project, the first project having at least one user associated therewith, the first key being generated on behalf a first user associated with the first project, the third key being generated on behalf of a second user associated with the first project;
    a program module comprising instructions for performing a method comprising:
        receiving an input from an administrator, the administrator not being among the at least one user associated with the first project, the input comprising a second key, a fourth key, an identifier of a first storage resource from the plurality of storage resources and a command for performing the disruptive operation;
        determining the first key and third key associated with the first storage resource by reading the keys associated with the project to which the first storage resource is associated;
        comparing the second key and the fourth key with the first key and the third key, respectively;
        verifying that the administrator is authorized as an administrator of the storage resource; and performing the disruptive operation on the storage resource if the second and fourth keys match the first and third keys associated with the storage resource and the administrator is authorized, and otherwise denying performance of the disruptive operation.

2. The storage controller of claim 1, the storage further comprising data for associating an expiry time with the first key, the program module further comprising instructions for determining if the first key has expired, the disruptive operation being performed only if the first key has not expired.

3. The storage controller of claim 1, the program module further comprising instructions to generate the first key in response to a request from a first user, and associate the first key with the first project.

4. The storage controller of claim 1, the storage further comprising data associating at least one user with the first project.

5. The storage controller of claim 1, the program module further comprising instructions to check whether the first and/or third keys has been revoked by a fourth user, wherein the operation is not performed if the respective key has been revoked.

6. A non-transitory computer readable medium embodying a computer program product for controlling a disruptive operation on a storage resource generated by an administrator, the computer program product containing computer-executable instructions which, when executed, cause a data processing system to perform:

responsive to receiving a first request from a first user for generation of a first key, generating the first key, providing the first key to the first user and associating the first key with the storage resource in at least one record of said data processing system, the first user being associated with the storage resource, the first user being other than the administrator;

responsive to receiving a second request from a second user for generation of a third key, generating the third key, providing the third key to the second user and associating the third key with the storage resource in at least one record of said data processing system, the second user being associated with the storage resource, the second user being other than the administrator;

responsive to receiving an input from the administrator, the input comprising a second key, a fourth key, and a command for performing the disruptive operation, comparing the second key with the first key, comparing the fourth key with the third key, and verifying that the administrator is authorized as an administrator of the storage resource; and performing the disruptive operation on the storage resource if the second key and the first key match, the third key and the fourth key match, and the administrator is authorized, and otherwise denying performance of the disruptive operation.

7. The non-transitory computer readable medium of claim 6, wherein the first key is stored in an object on a storage controller, the storage controller coupled to the storage resource.

8. The non-transitory computer readable medium of claim 6, wherein the computer program product verifies that the administrator is authorized as an administrator of the storage resource by checking that an administrator key supplied by the administrator matches an administrator key associated with the storage resource.

9. The non-transitory computer readable medium of claim 6, wherein generating the first key further comprises associating an expiry time with the first key, the disruptive operation being performed on the storage resource only if the expiry time has not elapsed.

10. The non-transitory computer readable medium of claim 6, wherein the computer-executable instructions further cause the data processing system to perform: checking whether the first and/or third keys has been revoked by a fourth user, wherein the operation is not performed if the respective key has been revoked.

* * * * *